United States Patent [19]

Watrous

[11] Patent Number: 4,907,253

[45] Date of Patent: Mar. 6, 1990

[54] CROSS-CONNECTED SWITCH HAVING MEANS FOR REMOVING SWITCHING MODULES WITHOUT INTERRUPTING SERVICE

[75] Inventor: Donald L. Watrous, Clifton Park, N.Y.

[73] Assignee: Pacific Bell, San Francisco, Calif.

[21] Appl. No.: 241,508

[22] Filed: Sep. 7, 1988

[51] Int. Cl.⁴ .................... H04M 3/12; H04M 3/22
[52] U.S. Cl. ............................ 379/16; 379/272; 379/335
[58] Field of Search .............. 379/16, 17, 12, 272, 379/273, 291, 292, 335, 9, 15

[56] References Cited

U.S. PATENT DOCUMENTS

3,851,122 11/1974 Gibson .................................. 379/16
3,978,291 8/1976 Bergeron et al. ..................... 379/16

*Primary Examiner*—Stafford D. Schreyer
*Attorney, Agent, or Firm*—McCubbrey, Bartels, Meyer & Ward

[57] ABSTRACT

The invention comprises an improved cross-connect switch constructed from a plurality of switch modules for connecting input lines to output lines. The improved switch includes a switch module replacement system that allows a craftsperson to replace a switch module without interrupting connections between cross-connect switch input and output lines that utilize switch points in the switch module in question.

5 Claims, 8 Drawing Sheets

CROSS-CONNECTED SWITCH HAVING MEANS FOR REMOVING SWITCHING MODULES WITHOUT INTERRUPTING SERVICE

The present invention relates to switching systems for use in communications networks and more particularly to cross-connect switches that must be capable of being repaired without interrupting service to users who are not affected by the particular switch point that has failed.

A cross-connect switch is a switching network that allows pairs of signal lines to be connected without disturbing connections between other lines connected by the cross-connect switch. In general, a cross-connect switch has, as its inputs, a plurality of input lines, and, as its outputs, a plurality of output lines. Each input line must be capable of being connected to any of the output lines, provided that the output line in question is not already connected to another input line. Furthermore, introducing a connection between a new input line and a new output line must not interrupt an existing connection between another input line and the output line to which it was connected.

Such cross-connect switches are particularly well suited for use in telecommunications systems. For example, each telephone subscriber is typically connected to a telephone central office by a pair of metallic conductors referred to as a subscriber loop. A subscriber is assigned a telephone number by connecting the subscriber loop that connects that subscriber to the central office to input lines of the central office switch that correspond to the telephone number in question. A cross-connect switch may be advantageously used to make these connections. For example, Bergeron, et al. (U.S. Pat. No. 3,978,291) describe a cross-connect switch adapted for making such connections in a telephone system.

In general, a cross-connect switch will be defined to be a switch that is capable of connecting any of N input lines to any of M output lines without disturbing existing connections. For the purposes of this discussion, such a cross-connect switch will be referred to as an N×M cross-connect switch. The cross-connect switch in question is typically constructed from a plurality of switch modules. Each switch module is itself a small cross-connect switch that provides a means for connecting any of a plurality of input lines to any of a plurality of output lines by closing a switch point connecting the input and output lines in question.

In cross-connect switches used for connecting telephone subscribers to the central offices servicing the subscribers, each of the input and output lines consists of two conductors referred to as tip and ring. In this case, each "switch point" includes two sets of contacts, one for connecting the tip conductor of the input line to the tip conductor of the output line and one for connecting the ring conductor of the input line to the ring conductor of the output line. In the following discussion, the term switch point will be used to denote the set of contacts that connect the conductors of an input line to the corresponding conductors of an output line. Similarly, the terms input line and output line will be used for the combination of a tip and ring conductor.

If the switch module has n input lines and m output lines, the switch module consists of n×m switch points. Each switch point allows one input line to be connected to one output line.

In principle, a cross-connect switch could be constructed from a single such switch module. However, the number of switch points needed to implement the cross-connect switch would be prohibitively large. For example, a cross-connect switch to connect any of 1000 input lines to any of 1000 output lines would require 1,000,000 switch points. This number can be substantially reduced if a number of smaller switch modules are combined to form the cross-connect switch.

Hence, a large cross-connect switch is typically divided into stages. Each stage is constructed from a plurality of switch modules. In "A Study of Non-blocking Switching Networks", Bell Systems Technical Journal, March 1953, pages 406-424, Clos has shown that a class of cross-connect switches may be viewed as a three stage switch. The switch in question makes connections between a set of input lines and a set of output lines. Assuming that a given input line is not currently connected to any output line and that a given output line is not currently connected to any input line, the switch can be used to provide a connection between the input and output lines in question without interrupting existing connections between other input and output lines. Each stage of the three stage switch is constructed from switch modules. The first stage switch modules connect the cross-connect switch input lines to switch modules in the center stage of the switch. Similarly, the third stage of the switch modules connect the cross-connect switch output lines to switch modules in the center stage. It should be noted that the center stage may be replaced by a multi-stage switch; hence, this method of viewing a cross-connect is applicable to switches having more than three stages.

For the purposes of this discussion, a set of connections that connect an input line to an output line will be referred to as a "call path". Each call path passes through one switch module in each stage of the cross-connect switch. For example, consider a five stage cross-connect switch, i.e., a three stage Clos cross-connect switch in which the center stage was itself a three stage cross-connect switch. Each call path is constructed by closing a switch print in each of five switch modules, one in each stage of the cross-connect switch in question.

A cross-connect switch of any practical size contains thousands of switch points. In telecommunications applications, each switch point is typically a mechanical switch. Although the individual switch points may have a high reliability, given the large number of such switch points in a cross-connect switch, failures will occur.

When a failure occurs, the switch module in question must be replaced. During this replacement operation, service may be interrupted to a number of subscribers. If the switch module in question is an N×N switch module, it may have provided call paths for up to N subscribers at the time the switch point in question failed. In general, the call paths that do not utilize the faulty switch point will not be affected by the failure in question. However, when the craftsperson removes the switch module containing the faulty switch point, service to these functioning call paths will be interrupted. Such interruptions are undesirable.

One prior art solution to interrupting service when a switch point fails is to rearrange the call paths in the cross-connect switch such that no call path passes through the switch module containing the faulty switch point. If the cross-connect switch has a significant fraction of its capacity in use, it is not always possible to find alternative paths for all call paths passing through the faulty switch module. Hence, this solution to the problem of interrupting service is not always possible.

Furthermore, if the faulty switch module is in either the input or output stage of the cross-connect switch, a call path passing through that switch module cannot be rerouted to avoid the switch module in question. Hence, when the switch module in question is removed for replacement, all call paths passing through that switch module must be interrupted.

Broadly, it is an object of the present invention to provide an improved cross-connect switch.

It is a further object of the present invention to provide a cross-connect switch in which a switch module having a faulty switch point may be removed without interrupting service on call paths that pass through the functioning switch points in the switch module.

These and other objects of the present invention will become apparent to those skilled in the art from the following detailed description of the present invention and the accompanying drawings.

SUMMARY OF THE INVENTION

The present invention comprises a cross-connect switch having a plurality of cross-connect switch input lines and a plurality of cross-connect switch output lines. The cross-connect switch provides a means for coupling specified ones of the input lines to specified ones of the output lines. The cross-connect switch includes an input stage, an output stage, and one or more intermediate stages arranged in a linearly ordered array of stages between the input stage and the output stage, the input stage being the first stage in the ordered array and the output stage being the last stage in the ordered array. Each input stage, output stage, and intermediate stage includes a plurality of switch modules; each of the switch module includes a plurality of input lines, a plurality of output lines, and a plurality of switch points.

Each intermediate stage switch module is coupled to a switch module in the immediately preceding stage by connecting an input line of the intermediate stage switch module to an output line of a switch module in the preceding stage. And each intermediate stage switch module is coupled to a switch module in the stage immediately following the intermediate stage containing the switch module in question by connecting an output line of the switch module to an input line of the switch module in said following stage.

Each of the input, output, and intermediate stage switch modules includes a switch point corresponding to each possible combination of an input line of said switch module and an output line of said switch module. Each switch point has a first state in which the switch point makes a connection between the input line and the output line in question and a second state in which the switch point does not make a connection between the input line and the output line.

The cross-connect switch also includes one or more test ports. Each test port comprises either an output stage switch module output line or an input stage switch module input line. The cross-connect switch also includes means for coupling a test port to a specified cross-connect switch input or output line. In addition, the cross-connect switch includes means for determining if a connection can be made between the test port coupled to the specified input line and a specified switch module in the cross-connect switch. Finally the cross-connect switch includes means coupled to the switch points for causing this connection to be made if it is determined that such a connection is possible.

DETAILED DESCRIPTION OF THE INVENTION

Figure 1:
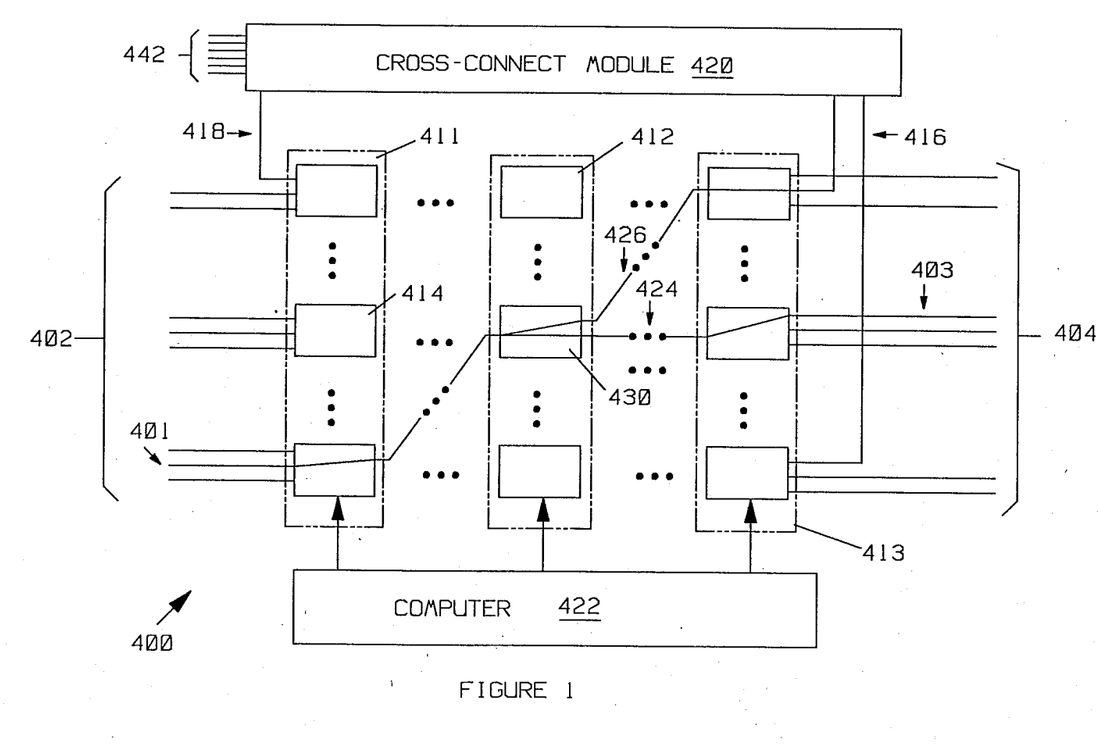
FIG. 1 is a block diagram of a cross-connect system according to the present invention.

A block diagram of a cross-connect switch system according to the present invention is illustrated in FIG. 1 at 400. Cross-connect switch system 400 has a plurality of cross-connect switch input lines 402 and a plurality of cross-connect switch output lines 404. As mentioned above each switch input line and switch output line consists of two conductors. Cross-connect switch system 400 provides a means for coupling a specified one of the input lines 402 to a specified one of the output lines 404 without interrupting existing connections between other input and output lines. A typical such connection is shown between input line 401 and output line 403.

Cross-connect switch system 400 includes a plurality of switch modules of which 414 is typical. Each switch module has a plurality of input and output lines, referred to as switch module input and output lines, respectively. Any switch module input line can be coupled to any switch module output line by closing one of a plurality of switch points in the switch module.

Figure 2:
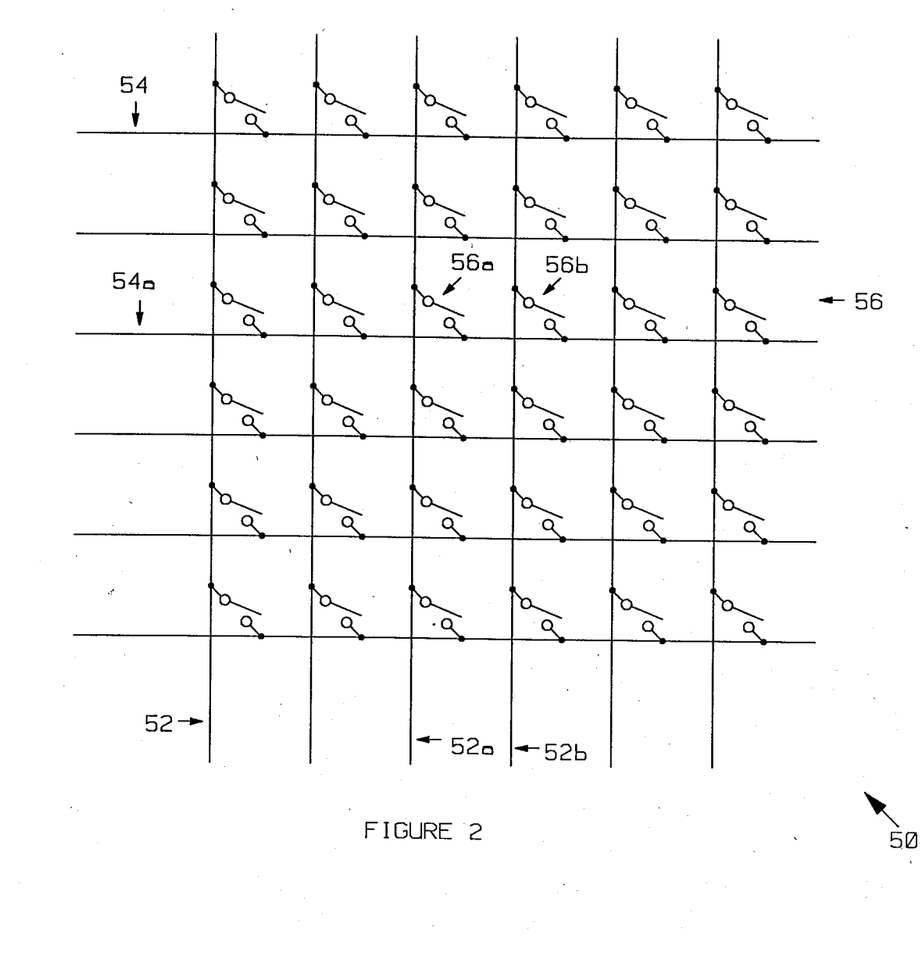
FIG. 2 a schematic diagram of one possible switch module for constructing a cross-connect switch according to the present invention.

Each of the switch modules is constructed from a plurality of switch points as shown in FIG. 2 at 50. As mentioned above, each switch point has two sets of contacts for connecting the tip and ring conductors of an input line to the corresponding conductors of an output line. For simplicity, each switch point is shown as a single switch in FIG. 2. Switch module 50 may be used to connect any of six input lines 54 to any of 6 output lines 52. Switch module 50 consists of 36 switch points 56. Each switch connects a specific input line 54 to a specific output line 52. As noted above, the switch points are typically controlled by external signals from a host computer which receives instructions specifying the desired connections.

Although the above description refers to mechanical switch points, it will be apparent to those skilled in the art that embodiments which utilize solid state switches such as transistors are also possible.

Although switch module 50 is normally used to connect precisely one input line to one output line, it may also be used to make a "T" connection in which one input line is connected to a plurality of output lines or vice versa. For example, input line 54a can be simultaneously connected to output lines 52a and 52b by simultaneously closing switch points 56a and 56b. Such "T" or bridging connections will be discussed in detail below with reference to the various embodiments of the present invention.

Referring again to FIG. 1, the switch modules are organized into an input stage 411, an output stage 413, and one or more intermediate stages 412. Each cross-connect switch input line 402 is connected to a corresponding input line in a switch module in the input stage 411. Similarly, each cross-connect switch output line 404 is connected to a corresponding output line of a switch module in output stage 413.

Each intermediate stage 412 includes a plurality of intermediate switch modules. Each said intermediate stage switch module is coupled to at least one switch module in the preceding stage by connecting an input line thereof to an output line of a switch module in said preceding stage. Similarly, each intermediate stage switch module is coupled to at least one switch module in the stage following said intermediate stage by connecting an output line thereof to an input line of a switch module in the following stage.

A connection is made between a cross-connect switch input line such as line 401 and a cross-connect switch output line such as line 403 by closing the appropriate switch points to form a call path such as path 424. These switch points are under the control of a computer 422.

Cross-connect switch system 400 also includes a small cross-connect module 420 which is also under the control of computer 422. Cross-connect module 420 is used to make connections around a switch module that contains a bad switch point. Once such connections are made, the switch module in question may be removed without interrupting service on the call paths passing through the remaining switch points on the switch module.

Cross-connect module 420 is connected to the various call paths through one or more test ports. Each test port comprises one of the cross-connect switch input or output lines. Test port 418 is an example of a cross-connect switch input line being used for a test port. Test port 416 is an example of a cross-connect switch output lie being used for a test port. These ports are referred to as test ports because they may also be used for making connections between a given call path and a test circuit that is used to make various measurements on the call path in question. This test circuitry has been omitted from the figures to simplify the figures.

Connections are made between a call path and a test port by making a bridging connection in a switch module through which the call path passes, as illustrated in switch module 430. The test port is connected to this switch module by closing a number of switch points that are not currently needed for implementing other call paths to form a connection between the test port and the switch module in which the bridging connection is to be made.

The possible paths from a given test port to each of the switch modules on the call path are computed by computer 422 using an algorithm that will be discussed in more detail below. If such a path exists, computer 422 closes the switch points in question to form the path.

This function is accomplished by utilizing a number of cross-connect module input lines 442. The manner in which this function is carried out may be more easily understood with reference to FIG. 3, which is a more detailed block diagram of a cross-connect system 100 according to the present invention.

Figure 3:
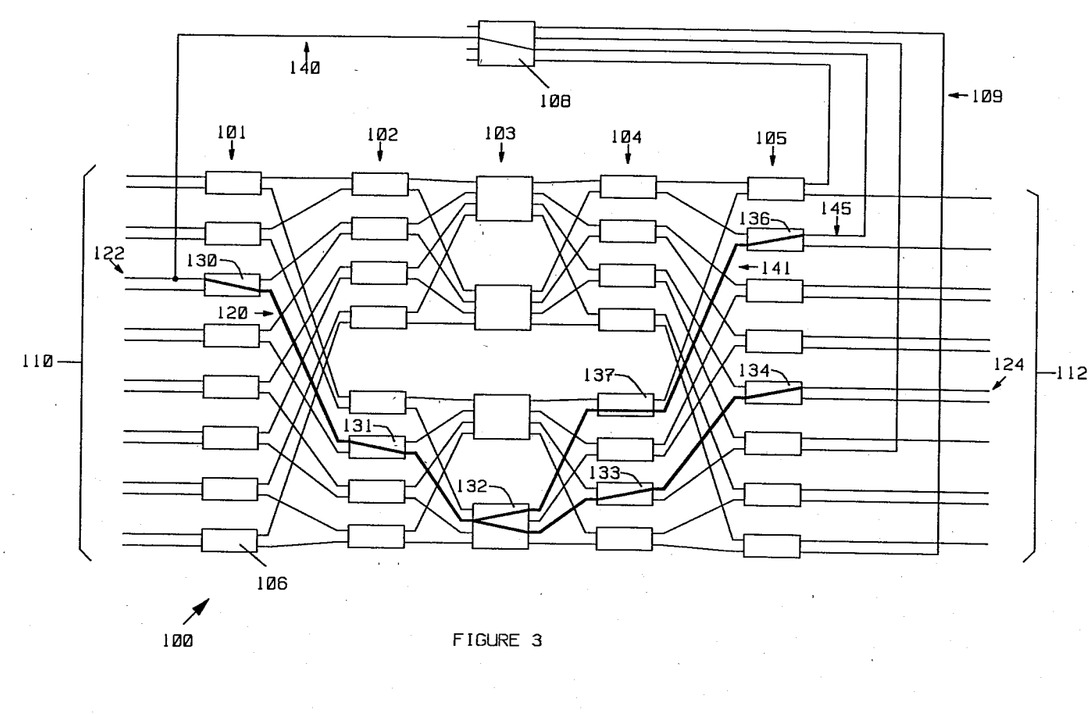
FIG. 3 is a more detailed block diagram of a cross-connect system according to the present invention.

Cross-connect system 100 includes five stages, 101-105. Stages 101, 102, 104, and 105 are constructed from 2×2 switch modules of which switch module 106 is typical. Stage 103 is constructed from 4×4 switch modules of which switch module 132 is typical. Cross-connect system 100 makes connections between a number of input lines 110 and a number of output lines 112. Each such connection is referred to as a call path.

The various physical connections between the input or output lines in any given switch module and the input or output lines in switch modules in adjacent stages are shown by thin lines in the figure. Exemplary call paths are shown by bold lines in the figure. The particular switch points that are closed to form the call paths in questions are indicated by lines connecting the corresponding input and output lines drawn within the switch module in question.

A typical call path through cross-connect system 100 is shown at 120. Call path 120 connects an input line 122 to an output line 124 via switch modules 130-134. The switch points in the various switch modules are under the control of a computer which has been omitted from the drawing for clarity.

For the purposes of this discussion, assume that switch module 131 is to be replaced because one of the switch points that is not being used to construct call path 120 is defective. To avoid interrupting service on call path 120, a patch 141 is introduced prior to removing switch module 131. The patch in question must make a connection between input line 122 and call path 120 at a point on call path 120 after call path 120 leaves switch module 131. Once this patch is constructed, switch module 131 may be removed without interrupting service on call path 120.

Patch 141 is constructed by connecting input line 122 to call path 120 at switch module 132. Patch 141 utilizes a cross-connect module 108 to connect input line 122 to a test port that comprises one of the output lines of switch module 136. Cross-connect module 108 is preferably a switch module of the same type used to construct the various stages of cross-connect system 100. As will be explained in more detail below, cross-connect module 108 is preferably constructed from a switch module that has the same number of input and output lines as the largest switch module in cross-connect system 100.

As discussed with reference to FIG. 1, a number of the output lines 112 are reserved for use as test ports. Each test port 109 is connected to a corresponding output line of cross-connect module 108. A jumper cable 140 is used to connect one or more of the input lines 110 to input lines of cross-connect module 108. The computer that controls the various switch modules and cross-connect module 108 instructs the craftsperson which input line is to be connected to jumper cable 140. The computer also determines which test port can be connected to call path 120. This test port is then connected to input line 122 by closing the appropriate switch points in cross-connect module 108. The test port in question is then connected to call path 120 by closing the appropriate switch points. In the case illustrated in FIG. 3, switch points in switch modules 136 and 137 are used to connect test port 145 to switch module 132. A bridging connection is then made in switch module 132 to call path 120.

The size of cross-connect module 108 determines the maximum sized switch module that may be "jumpered" out prior to removal. If the switch module in question has more than one functioning call path connected through it, additional jumper cables are connected from the cross-connect module input lines to the input lines corresponding to the additional call paths. Each call path is bridged using a different test port so that all of the call paths can be simultaneously jumpered.

In principle, an N×N switch module could be providing connections for N call paths. Hence, if all of these call paths were to be patched, cross-connect module 108 would need to be at least an N×N switch module.

In the preferred embodiment of the present invention, any switch module within the cross-connect switch is to be replaceable without interrupting the functioning call paths passing therethrough. As a result, if cross-connect module 108 is an N×M switch module, N must be greater than or equal to the number of input lines in the largest switch module in the cross-connect switch minus one, and M must be equal to the number of test ports. The size of a switch module is defined to be the number of input lines thereto. That is, a switch module with N+1 input lines is defined to be larger than one with N input lines. Two switch modules will be defined to be the same size if they have the same number of input and output lines.

This choice of cross-connect switch module size, however, causes some problems. In general, it is economically advantageous to limit the number of different switch modules used in a cross-connect switch. Such limitations increase the economies of scale and reduce the number of different spare parts that must be kept on hand. Hence, in the preferred embodiment of the present invention, a switch module that is the same size as the largest switch module in the cross-connect switch is utilized. If the number of available test ports is greater than the number of output lines of this switch module, a sub-set of the available test ports is chosen for connection to the output side of the cross-connect module. It has been found experimentally that this is a satisfactory number of test ports in cross-connect systems of the sizes normally used in telecommunications applications. However, it will be apparent to those skilled in the art that the present invention may be used advantageously, if not optimally, with a cross-connect module of a different size.

The present invention depends on being able to find paths connecting one of the test ports to one of the switch modules through which the call path passes. These paths will be referred to as test paths in the following discussion. A test path can only utilize switch points that are not being used to construct call paths. In the preferred embodiment of the present invention, two types of test paths, referred to as direct and zig-zag test paths, are used.

The test path 141 shown in FIG. 3 is referred to as a direct test path, since the test path starts at a test port and proceeds in the same direction through the cross-connect switch until it reaches the switch module at which the "T" connection is to be made. It will be apparent from an examination of FIGS. 3 and 4 that the ability to connect a given switch module to a given test port by a direct path increases as the number of switch stages between the test port and switch module in question increases.

Figure 4:
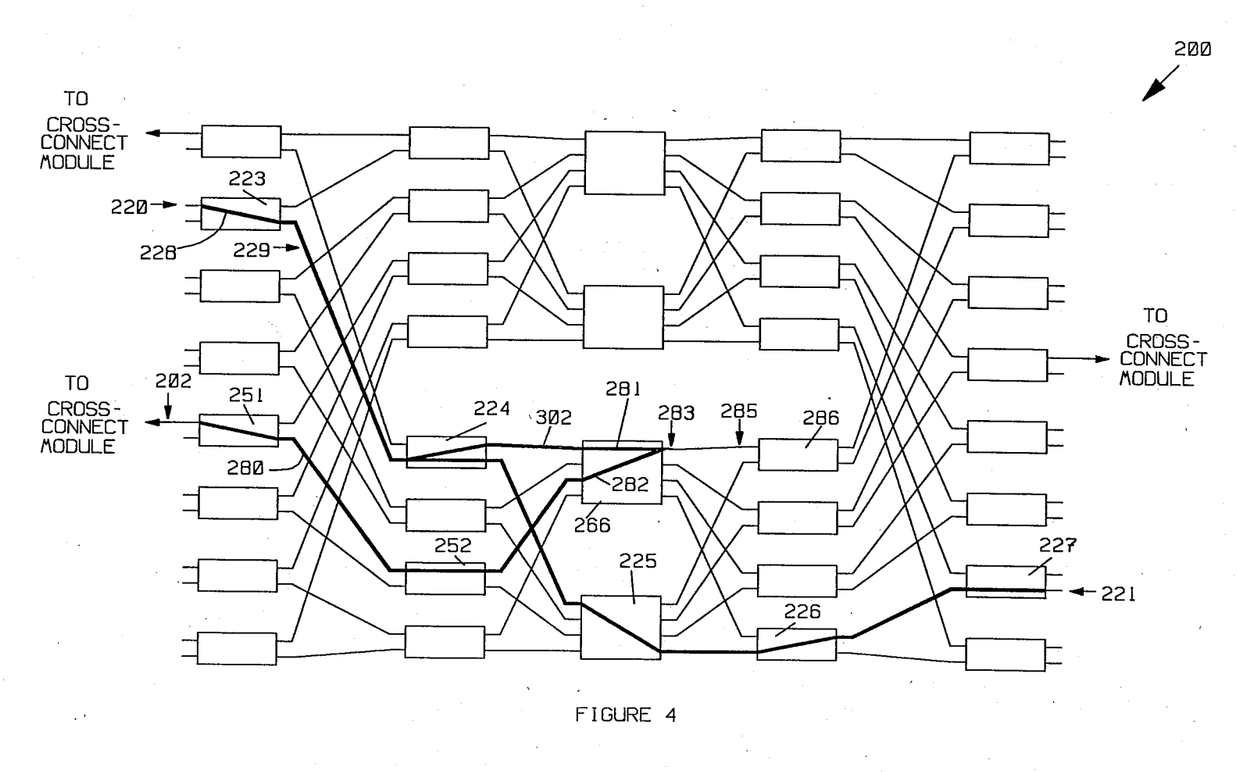
FIG. 4 is a block diagram of a cross-connect system according to the present invention that includes a zig-zag test path.

To provide greater access to the switch modules in the stages near to the test ports, "zig-zag" paths are also employed. FIG. 4 illustrates a cross-connect switch 200 with a zig-zag test path 280 for connecting test port 202 to call path 229 at switch module 224. Call path 229 passes through switch modules 223-227 and is constructed by closing switch points in these switch modules that are not currently being utilized by other call paths. Test path 280 passes through switch modules 251 and 252 in the forward direction and then reverses direction in switch module 266. This reversal is accomplished by connecting input lines 281 and 282 of switch module 266 to output line 283. For this approach to be successfully used, input line 285 of switch module 286 must not be connected to any of the output lines of switch module 266 while the test path is operative. The switch module in which the direction reversal occurs will be referred to as the pivot switch module hereinafter.

It will be apparent from FIG. 4 that zig-zag paths provide increased access between test ports and switch modules that are in the adjacent stage to the stage containing the test ports. As a result, the probability of being able to find a test path between one of the test ports and any given call path is significantly improved if zig-zag paths are included in the allowable test paths.

Figure 5:
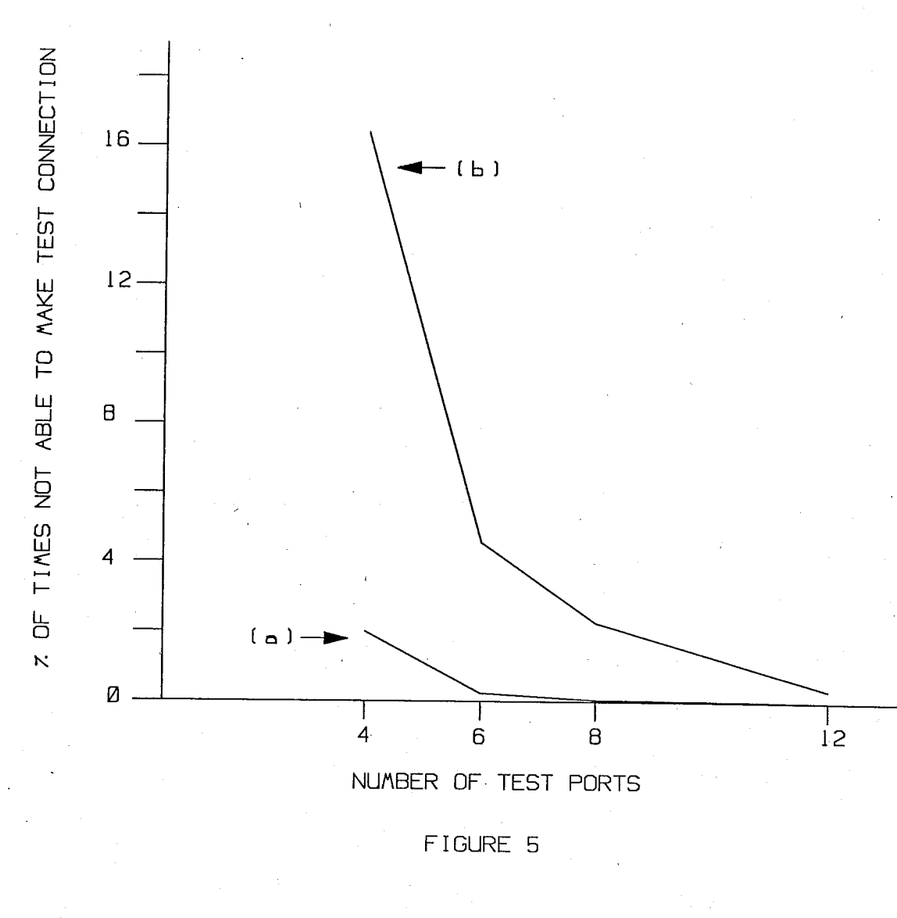
FIG. 5 is a graph illustrating the improvement obtained by including zig-zag test paths.

This is illustrated in FIG. 5, which compares the probability of failing to make a connection to a given call path with and without zig-zag paths. Curve (a) is the probability with direct paths or paths having one zig-zag. Curve (b) is the probability with direct paths only. The data plotted in FIG. 5 were computed for a cross-connect switch having 648 input lines and 1296 output lines, of which 85% of the input lines were busy. That is, 85% of the input lines were part of existing call paths. Cross-connect switches having different numbers of input and output lines will be discussed in more detail below. For the purposes of this discussion, it is sufficient to note the large improvement obtained by allowing test paths with one zig-zag. In fact, with 12 test ports, the use of zig-zag paths having only one reversal of direction reduces the probability of not being able to make a test connection by more than a factor of 50.

Figure 6:
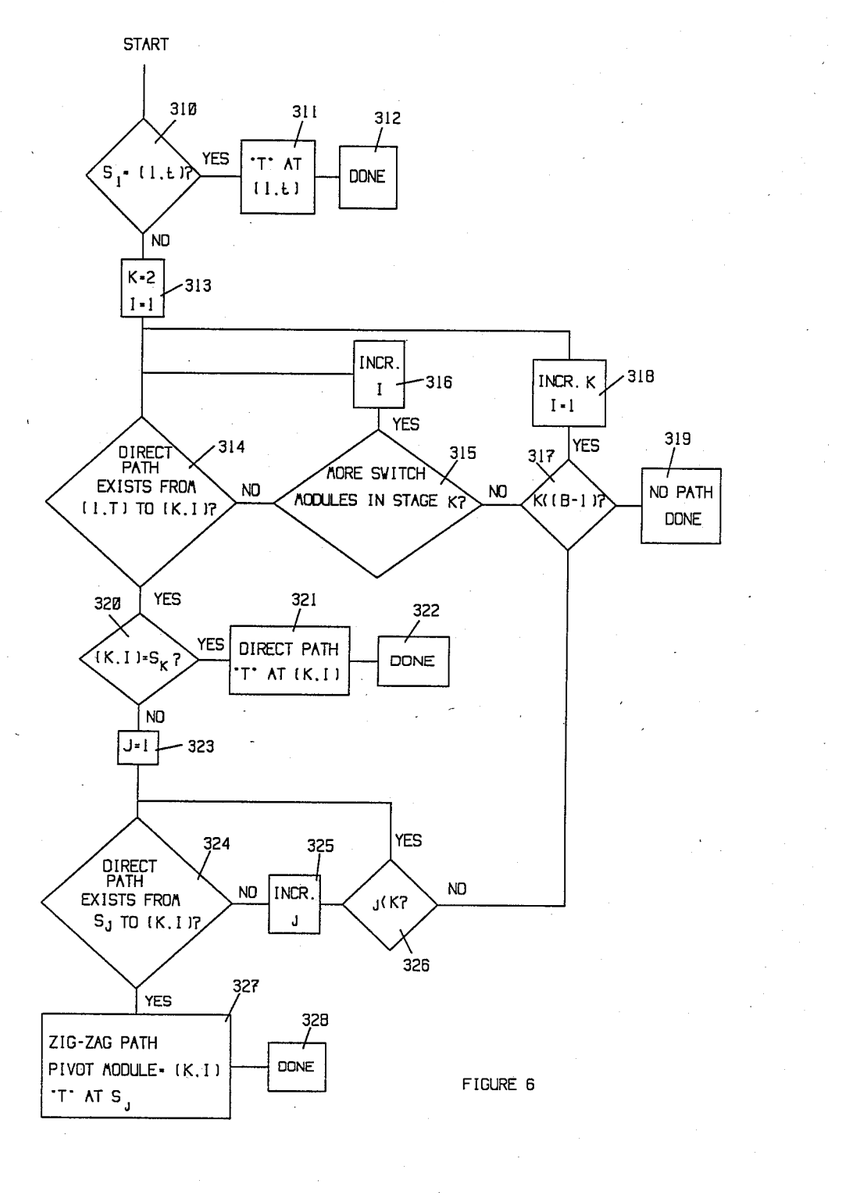
FIG. 6 is a flow chart of the basic algorithm for finding test paths.
Figure 7:
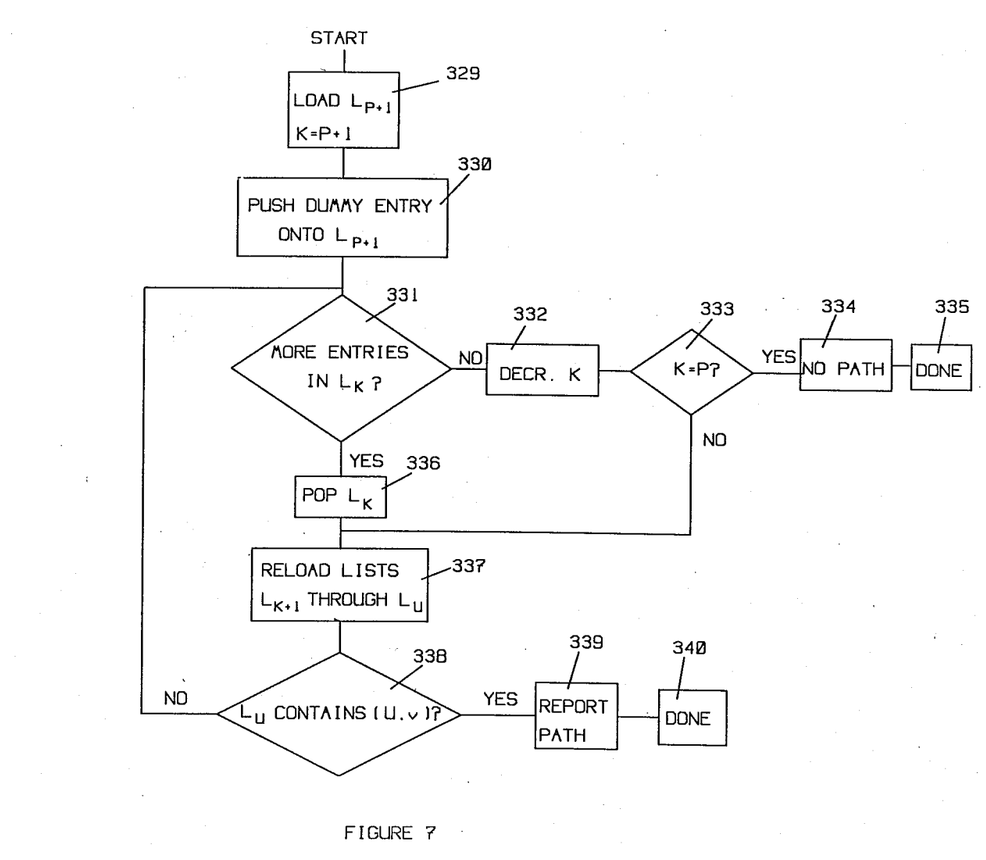
FIG. 7 is a flow chart of an algorithm for finding paths connecting two specified switch modules in a cross-connect switch according to the present invention.

The preferred method of finding test paths that connect a given test port to a call path can be more easily understood with reference to FIGS. 6–7, which are flow charts for a computer algorithm that computes the available test paths. As noted above, each of the switch modules in the cross-connect switch is connected to a computer controlling the switch points within the switch module. The connections to this computer have been omitted from the figures for reasons of clarity. This computer stores the configuration of the cross-connect switch including a map of which switch modules are connected and which switch points are closed at any given time.

For the purposes of this discussion, it is useful to assign the various switch modules identification numbers. A given switch module may be specified by giving the stage of the cross-connect switch in which it is located and the position of the switch module in that stage. The notation (x,y) denotes the switch module "y" in stage "x". The stages of the cross-connect switch are numbered from one to N beginning with the stage that contains the test port in question. Within each stage, the switch modules are numbered from top to bottom of the stage.

It should be noted that a path connecting switch module (x,y) to switch module (p,q) may be unambiguously specified by the list of switch modules through which the path passes. The individual input and output lines used need not be given, since there is only one line connecting any two given switch modules in adjacent stages.

Any zig-zag path having one pivot switch module can be decomposed into two direct paths. The first direct path connects the test port to the pivot switch module, and the second direct path connects the pivot switch module to a switch module on the call path which is to be bridged. Referring again to FIG. 4, zig-zag path 280 is composed of a direct path passing through switch modules 251, 252, and 266, and a direct path connecting switch module 266 to switch module 224. Here, switch module 266 is the pivot switch module.

FIG. 6 is a flow chart of the basic test path finding algorithm. The algorithm takes as its input the configuration of the cross-connect switch, the identity of the test port, and the call path that is to be bridged. The switch modules through which the call path passes will be denoted by $S_k$, where k runs from one to N, the number of stages in the cross-connect switch. That is, if the call path passes through switch module x in stage y, $S_y=(y,x)$. By definition, the test port is located in the first stage. The test port will, therefore, be in switch module (1,t) where t is the number of the first stage switch module containing the test port in question. The switch module that is to be removed from the cross-connect switch is denoted by (B,L), i.e., the Lth switch module in stage B.

The computer starts by examining $S_1$ to be sure that it is not (1,t) as shown at 310-312 in FIG. 6. If it is, then the test path is merely a "T" connection in switch module (1,t). For most of the possible call paths and test ports, this will not be the case. In these cases, the computer must sequentially examine each of the stages after the first stage to determine if a test path can be constructed utilizing the switch modules prior to this stage and one switch module from this stage. At any given time, the stage being examined is indicated by an index K and the switch module in that stage which is being examined is indicated by an index I. These indices are initialized as shown at 313. If the computer is examining the Ith module in the Kth stage, the algorithm first checks for a direct path from (1,t) to switch module I as shown at 314. If no such path exists, the algorithm proceeds to the examination of the next switch module unless this switch module was the last one to be examined. The last stage to be examined is the stage before that containing the switch module to be replaced, i.e., stage (B−1). This is shown at 315-319 in FIG. 6. If there are no more switch modules to examine, a test path between (1,t) and the call path does not exist. In this case, the algorithm is repeated with a different test port.

If such a path exists, the algorithm checks for the case in which (K,I) is also $S_K$ as shown at 320-322. In this case, a direct test path exists from (1,t) to the call path with the "T" connection being made at $S_K$.

If $S_K$ is not equal to (K,I) but a test path exists to (K,I), the algorithm checks for a zig-zag path in which (K,I) is the pivot module and in which the "T" connection is made at $S_j$ for some j between 1 and K. This is shown at 323-328 in FIG. 6. The search is accomplished by sequentially examining each $S_j$ to determine if a direct path exists between (K,I) and $S_j$. If such a path exists, then a zig-zag path also exists, and this zig-zag path is reported.

If no such path exists, the algorithm proceeds to the next switch module to be examined as shown at 326. A path may be absent because the switch modules in question may not be connected by a direct path. Alternatively, a path may, in principle, exist, but one or more switch points needed to construct the path are being used to construct other call paths through the cross-connect switch. The next switch module will either be the next switch module in stage K or the first switch module of the next stage. If all of the switch modules are exhausted without finding a test path, then another test port is chosen and the process repeated.

The above algorithm depends on being able to find a path connecting a first switch module (P,q) to a second switch module (U,v). In principle, this can be accomplished by sequentially checking each possible combination of switch modules that joins the two switch modules in question. However, it will be apparent to those skilled in the art that such a search is impractical in a large cross-connect switch since the number of possible combinations can easily be in the hundreds of millions.

Hence, in the preferred embodiment of the present invention, this is accomplished by first reducing the number of possible combinations using the observation that any given switch module only connects to a small fraction of the switch modules in the adjacent stages. For each stage, a push down list, $L_i$, is created that contains the identities of the switch modules that can be reached from a given switch module in the prior stage. A flow chart of an algorithm that utilizes such lists to find a path from (P,q) to (U,v) is shown in FIG. 7.

The algorithm starts as shown at 329 and 330 by loading $L_{P+1}$ with switch modules that can be reached from (P,q). Each such switch module is pushed onto list $L_{P+1}$ after checking to be sure that a connection is possible and that the required switch points are free. An index K which is used to keep track of the lists is initialized to point to list $L_{P+1}$. A dummy entry is loaded onto the top of $L_{P+1}$ to save repeating computer code.

Next, $L_K$ is examined to determine if there are any remaining entries as shown at 331. If an entry exists, the top entry on $L_K$ is popped to expose the new entry as shown at 336 and lists $L_{K+1}$ through $L_U$ are reloaded as shown at 337. If no such entry exists, K is decremented and the lists are reloaded as shown at 332 and 333. If K is equal to P after the decrementing operation, the process is terminated as shown at 334 and 335 because no path is possible.

Assuming that the lists were reloaded as shown at 337, list $L_i$ will contain the switch modules that can be connected to the switch module on the top of $L_{i-1}$ for i=P+1 to U. The algorithm then examines each entry in the last list, $L_U$, to determine if an entry exists which is equal to (U,v) as shown at 338. If such an entry exists, a path can be constructed between the switch modules in question. The switch modules making up this path are those on the top of each of the push-down lists $L_i$ for i=P+1 to U−1. This path is reported as shown at 339 and 340.

If none of the entries in $L_U$ is (U,v), the current entry on the top of $L_{U-1}$ is "popped off" to expose a new switch module. List $L_U$ is then loaded with the switch modules that can be reached from this new switch module and the process repeated. When the Kth list, $L_K$, is exhausted, i.e., the last entry in that list has been examined and popped off, the top entry on $L_{K-1}$ is popped off, and lists $L_K$ to $L_U$ are reloaded. If $L_{P+1}$ is exhausted without finding a path, no such path exists.

The preferred location of the test ports and the preferred number of test ports will depend on the size and shape of the cross-connect switch. In general, the number of test ports will be significantly less than the number of switch modules in either the input or output stages of the cross-connect switch.

If the cross-connect switch has equal numbers of input and output lines, the test ports are preferably located on both the input and output stage switch modules. Assuming that a call path has an equal probability of going through any given switch module in a given stage of the cross-connect switch, the test ports are preferably equally spaced in the input and output stages.

If the test port in question is on the input side of the cross-connect switch, the jumper connection is made to the output line utilized by the call path in question. A test path is then sought from the test port to a switch module that is in a stage between the defective switch module and the output line in question. This is equivalent to exchanging the input and output line definitions used in the above discussion.

If the cross-connect switch has fewer input than output lines, the test ports are preferably located on the switch modules in the output stage. If there are more input lines than output lines, the test ports are preferably located on the switch modules in the input stage.

Cross-connect switches having different numbers of input and output lines are particularly useful in telecommunication applications in which a subset of a large number of communication lines is to be connected to a central office via feeder lines. For example, when a telephone cable serving a particular geographic area is put in place, redundant communication lines are normally furnished to provide alternate connections between subscribers' premises and the central office serving those premises. When these redundant lines are not in use, they are not connected to the central office. A cross-connect switch may be used to automate the substitution of one of these redundant lines for an existing line when the existing line fails. In such a system, a cross-connect switch having typically twice as many output lines as input lines is used. The lines from the subscribers' premises and the redundant lines are connected to the output side of the cross-connect switch. The feeder lines from the central office are connected to the input side of the cross-connect switch. By closing the appropriate switch points in the cross-connect switch, the desired lines to the subscriber premises may be connected to the central office. Such a cross-connect switch is in discussed detail in a copending U.S. patent application (Ser. No. 098,519).

Figure 8:
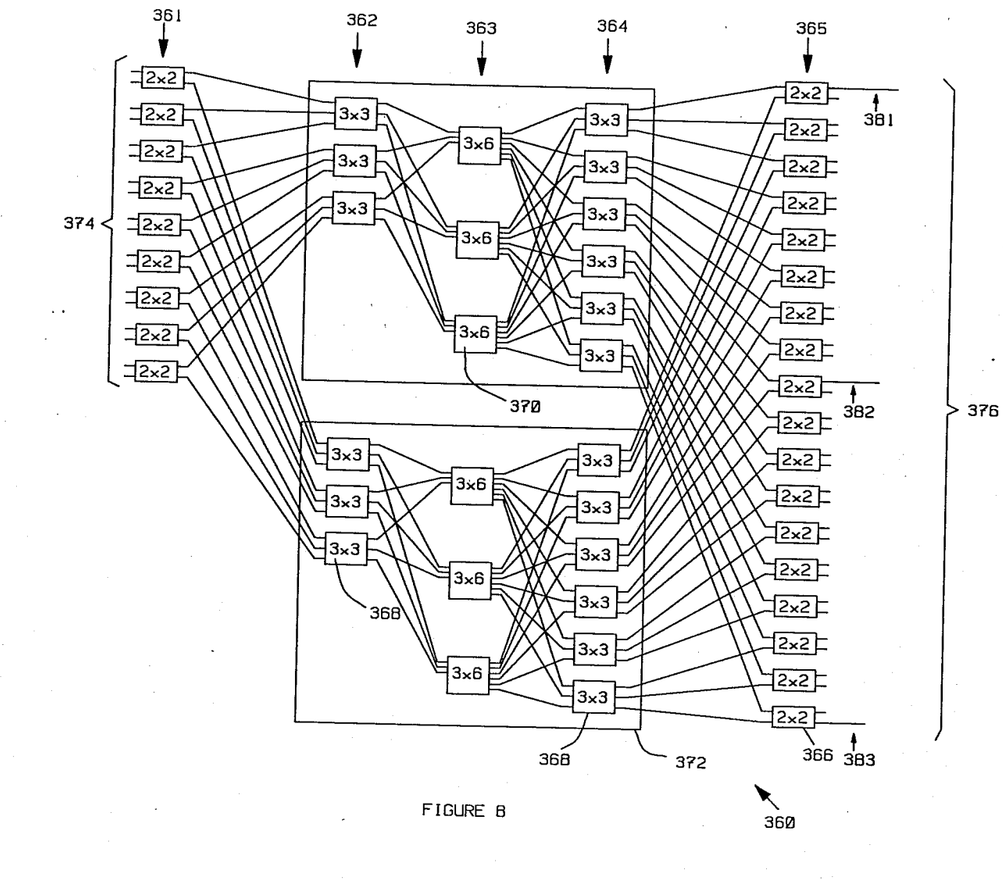
FIG. 8 is a block diagram of a cross-connect switch according to the present invention that has different numbers of input and output lines.

FIG. 8 illustrates a cross-connect switch 360 having 18 input lines 374 and 36 output lines 376. The center stage of cross-connect switch 360 is constructed from switch modules 370 having three input lines and 6 output lines. Cross-connect switch 360 has five stages, 361 through 365. Stages 361 and 365 are constructed from switch modules 366 having 2 input lines and 2 output lines, and stages 362 and 364 are constructed from switch modules 368 having 3 input lines and 3 output lines.

The center stage switch modules are grouped together. Three center stage switch modules are connected such that each switch module is connected to 6 switch modules in stage 364 and 3 switch modules in stage 362. These center stage switch modules and the switch modules in stages 362 and 364 to which they are connected can be viewed as a single three stage switch module 372 having 9 input lines and 18 output lines. Cross-connect switch 360 may then be viewed as a three stage switch having a center stage constructed from two switch modules having 9 input lines and 18 output lines.

Since the output stage 365 has more lines than the input stage 361, the test ports are preferably located on the output stage switch modules. Three such test ports are shown at 381 through 383. The test ports are preferably located on the output switch modules. This choice of test port location increases the probability of finding a test path that will connect to any given call path with the connection being made in a switch module in stages 363, 364, or 365.

At any given time, cross-connect switch 360 will have a number of call paths established therethrough. Each of these call paths is constructed by closing switch points in the various switch modules through which the call path passes. These switch points are not available for constructing the desired test paths. As more and more call paths are established through the cross-connect switch, the ability to find free switch points for constructing a test path decreases.

Consider the case in which 18 call paths are simultaneously set up through cross-connect switch 360. In this case, 18 input and output lines will be in use in each stage of cross-connect switch 360. As a result, every input and output line in the switch modules in stages 361 and 362 will be in use. Hence, it would not be possible to construct a test path passing through these stages. However, only half of the input and output lines in the switch modules in stages 364 and 365 would be busy. Hence, it is possible to construct test paths which bridge a call path on the switch modules in stages 364 and 365 through which the call path passes.

The above example is an extreme case, since a cross-connect switch almost never operates at 100% of capacity. However, it is clear from this example that the probability of being able to make a connection to a call path on a switch module on the output side of center stage 363 is greater than that of making a connection to a switch module through which the call path passes on the input side of center stage 363.

Utilizing test ports on the output side of the cross-connect switch makes use of this increased probability in two ways. First, the probability of finding a test path is increased. Since there are more switch points available in the output half of the cross-connect switch, there are more possible test paths.

Second, the computational time needed to find a test path may be significantly reduced. It has been found that the process of searching for a test path can be simplified without a significant decrease in the probability of finding a test path. In particular, it has been found experimentally that the search for a test path can be terminated when all switch modules in the center stage have been examined. If no test path has been found by this point in the above described algorithm, another test port is chosen.

The above description of the present invention has been made with reference to a cross-connect switch having an odd number of stages and constructed according to the three stage topology described by Clos.

It will be apparent to those skilled in the art that the present invention is applicable to a much larger class of cross-connect switches.

Accordingly, there has been described herein an improved cross-connect switch and method for removing defective switch modules without interrupting service on functioning call paths passing through the defective switch module. Various modifications to the present invention will become apparent to those skilled in the art from the foregoing description and accompanying drawings. Accordingly, the present invention is to be limited solely by the scope of the following claims.

What is claimed is:

1. A cross-connect switch having a plurality of cross-connect switch input lines and a plurality of cross-connect switch output lines, said cross-connect switch providing means for coupling specified ones of said input lines to specified ones of said output lines, said cross-connect switch comprising an input stage, an output stage, and one or more intermediate stages arranged in a linearly ordered array of stages between said input stage and said output stage, said input stage being the first stage in said ordered array and said output stage being the last stage in said ordered array, each of said input stage, output stage, and intermediate stage comprising a plurality of switch modules, each said switch module comprising a plurality of input lines, a plurality of output lines, and a plurality of switch points;

each said intermediate stage switch module being coupled to a switch module in the immediately preceding stage by connecting an input line of said intermediate stage switch module to an output line of a switch module in said preceding stage, and each said intermediate stage switch module being coupled to a switch module in the stage immediately following the said intermediate stage containing said switch module by connecting an output line of said switch module to an input line of a said switch module in said following stage, wherein, each said input, output, and intermediate stage switch modules includes one said switch point corresponding to each possible combination of a said input line of said switch module and a said output line of said switch module, each said switch point having a first state in which said switch point makes a connection between said input line and said output line and a second state in which said switch point does not make a connection between said input line and said output line, said cross-connect switch further comprising:

test means comprising one or more test ports, each said test port comprising either one of said output stage switch module output lines or one of said input stage switch module input lines;

test cross-connect means for coupling a said test port to a specified cross-connect switch input line or output line;

means for determining if a connection can be made between the said test port coupled to said specified input line and a first specified switch module in said cross-connect switch; and means coupled to said switch points for causing said connection to be made if said determining means determines that said connection exists.

2. The cross-connect switch of claim 1 wherein said test cross-connect means comprises switch module including N input lines, M output lines, and a plurality of switch points, each said switch point corresponding to one of the possible combination of a said input line and a said output line, each said output line being coupled to a corresponding test port.

3. The cross-connect switch of claim 2 wherein N is equal to the maximum of the number of input lines or output lines in the largest switch module in said input, output, and intermediate stages and M is equal to the number of said test ports.

4. The cross-connect switch of claim 1 wherein the total number of output stage switch module output lines is larger than the total number of input stage switch module input lines and wherein each said test port comprises an output stage switch module output line.

5. The cross-connect switch of claim 1 wherein said determining means further comprises means for determining if a connection can be made between a second specified switch module in said cross-connect switch and said first specified switch module.

* * * * *